United States Patent
Ikeya et al.

(10) Patent No.: US 8,550,561 B2
(45) Date of Patent: Oct. 8, 2013

(54) VEHICLE SEAT

(75) Inventors: Kazuhiro Ikeya, Wako (JP); Takayuki Toyoshima, Wako (JP); Hideki Hitomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 13/174,627

(22) Filed: Jun. 30, 2011

(65) Prior Publication Data

US 2012/0001472 A1 Jan. 5, 2012

(30) Foreign Application Priority Data

Jul. 1, 2010 (JP) .................................. 2010-151309

(51) Int. Cl.
*A47C 7/36* (2006.01)
(52) U.S. Cl.
USPC .......................................... 297/410; 297/391
(58) Field of Classification Search
USPC ................... 297/410, 406, 407, 404, 391
See application file for complete search history.

(56) References Cited

U.S. PATENT DOCUMENTS

| | | | | |
|---|---|---|---|---|
| 507,044 A | * | 10/1893 | Schmidt | 248/409 |
| 1,977,159 A | * | 10/1934 | Tursi | 297/112 |
| 5,711,579 A | * | 1/1998 | Albrecht | 297/410 |
| 6,460,931 B2 | * | 10/2002 | Beck | 297/410 |
| 7,165,814 B2 | * | 1/2007 | Gans et al. | 297/391 |
| 2005/0200185 A1 | * | 9/2005 | Yokoyama et al. | 297/410 |
| 2012/0086255 A1 | * | 4/2012 | Ishimoto et al. | 297/406 |
| 2012/0098316 A1 | * | 4/2012 | Matsushima et al. | 297/391 |
| 2012/0112510 A1 | | 5/2012 | Ishimoto et al. | |

FOREIGN PATENT DOCUMENTS

| | | |
|---|---|---|
| JP | 10-226255 | 8/1998 |
| JP | 2010228493 A * | 10/2010 |
| WO | WO 2010/150372 | 12/2010 |
| WO | WO 2010/150373 | 12/2010 |
| WO | WO 2010150373 A1 * | 12/2010 |

OTHER PUBLICATIONS

Japanese Office Action for corresponding JP Application No. 2010-151309, Apr. 4, 2012.

* cited by examiner

*Primary Examiner* — David E Allred
(74) *Attorney, Agent, or Firm* — Ditthavong Mori & Steiner, P.C.

(57) ABSTRACT

A vehicle seat includes a seatback, a headrest body, a stay and a locking member. The seatback is provided on a floor of a vehicle body. The headrest body is provided above the seatback. The stay extends downward from the headrest body into the seatback. The locking member, provided to the seatback and engaging with the stay at a specific position in a longitudinal direction of the stay, engages with the stay at a substantially longitudinal center of the stay when the headrest body is positioned at a lowest position.

4 Claims, 9 Drawing Sheets

FIG. 6A HEADREST: BASE POSITION
—— PRESENT INVENTION
----- COMPARATIVE EXAMPLE

FIG. 6B HEADREST: BASE POSITION+80 mm
—— PRESENT INVENTION
----- COMPARATIVE EXAMPLE

FIG. 6C HEADREST: BASE POSITION+140 mm
—— PRESENT INVENTION
----- COMPARATIVE EXAMPLE

VEHICLE SEAT

CROSS-REFERENCE TO RELATED APPLICATIONS

The present application claims priority under 35 U.S.C. §119 to Japanese Patent Application No. 2010-151309, filed Jul. 1, 2010, entitled "Vehicle Seat." The contents of this application are incorporated herein by reference in their entirety.

BACKGROUND OF THE INVENTION

1. Field of the Invention

The present invention relates to a vehicle seat.

2. Description of the Related Art

A related-art vehicle seat includes a cushion-side frame of a seat cushion, a seatback-side frame of a seatback reclinably attached to the cushion-side frame, a pillow-side frame vertically movably attached to the seatback-side frame, and a mass body (weight) attached to the pillow-side frame with left and right springs interposed therebetween.

The left and right springs each have one end thereof anchored to the mass body (weight) and the other end thereof anchored to the pillow-side frame. That is, the mass body (weight) is hung on the pillow-side frame with the left and right springs in such a manner as to be rockable in the vehicle width direction.

According to such a vehicle seat, since the mass body (weight) and the left and right springs form a dynamic damper (damper mechanism), vibration (resonance) of the vehicle seat in the vehicle width direction is suppressed (see, for example, Japanese Unexamined Patent Application Publication No. 10-226255).

The vehicle seat disclosed by Japanese Unexamined Patent Application Publication No. 10-226255 includes the dynamic damper provided on the pillow-side frame so as to suppress vibration. The dynamic damper includes the mass body (weight) and the left and right springs.

SUMMARY OF THE INVENTION

According to one aspect of the present invention, a vehicle seat includes a seatback, a headrest body, a stay and a locking member. The seatback is provided on a floor of a vehicle body. The headrest body is provided above the seatback. The stay extends downward from the headrest body into the seatback. The locking member, provided to the seatback and engaging with the stay at a specific position in a longitudinal direction of the stay, engages with the stay at a substantially longitudinal center of the stay when the headrest body is positioned at a lowest position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

An embodiment of the present invention will now be described with reference to the accompanying drawings, wherein like reference numerals designate corresponding or identical elements throughout the various drawings.

Embodiment

Figure 1:
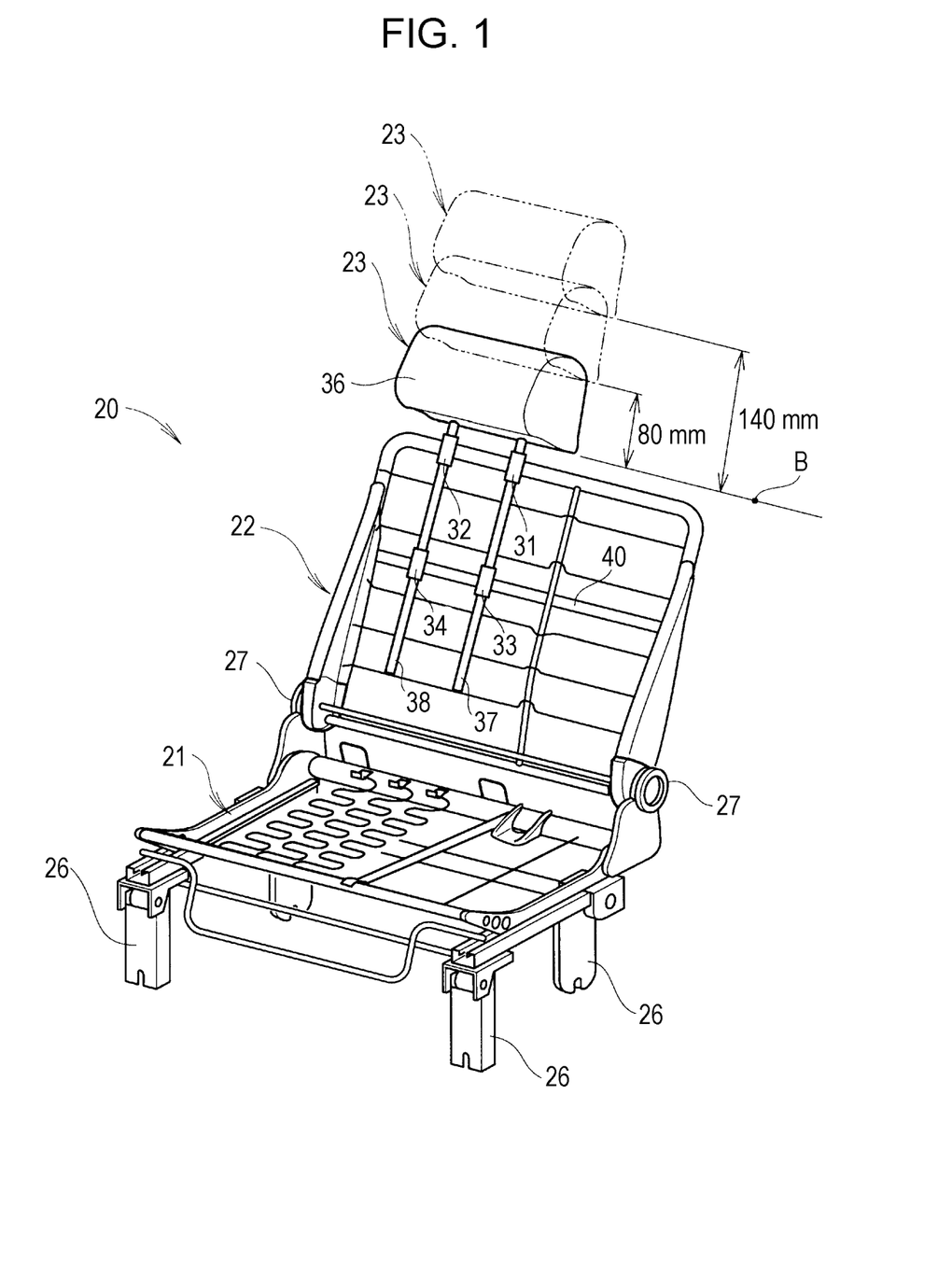
FIG. 1 is a perspective view of a vehicle seat according to an embodiment of the present invention.
Figure 2:
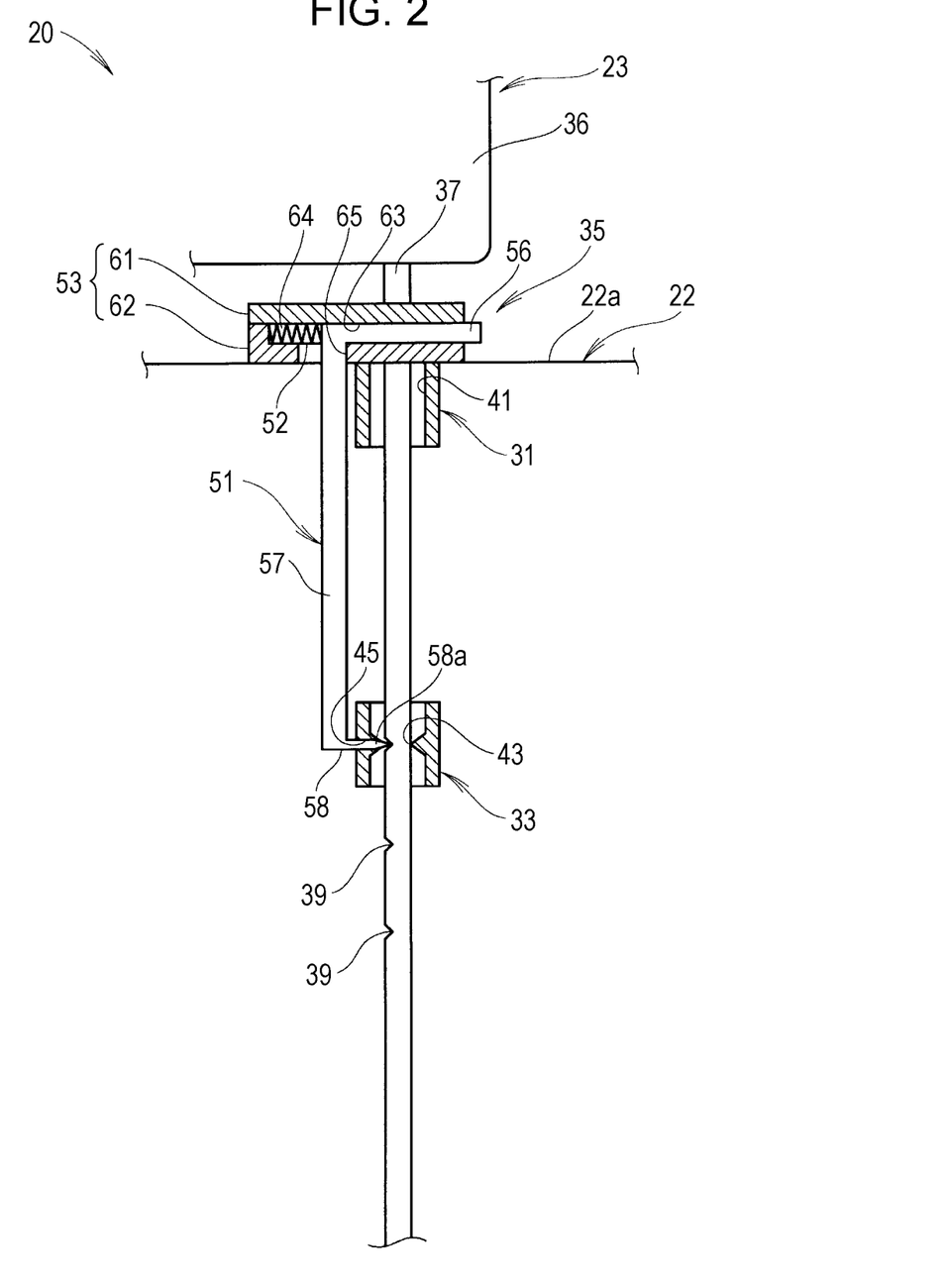
FIG. 2 is a front sectional view of a height adjustment mechanism of the vehicle seat illustrated in FIG. 1.
Figure 3:
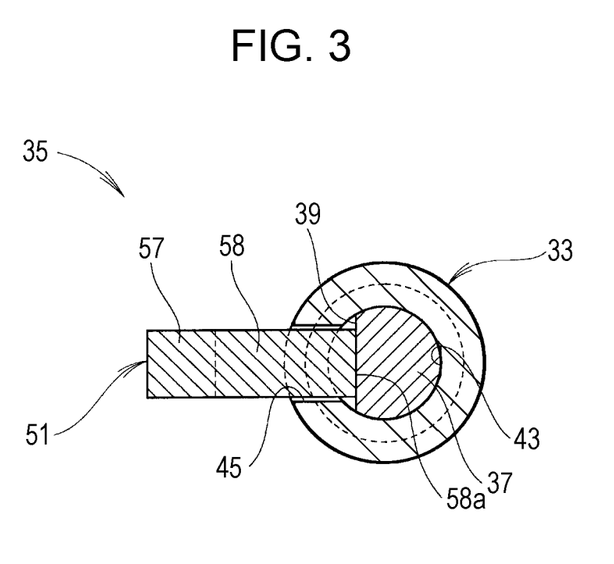
FIG. 3 is a plan sectional view of the height adjustment mechanism of the vehicle seat illustrated in FIG. 1.

Referring to FIGS. 1 to 3, a vehicle seat 20 is intended particularly to be a second-row seat among three rows of seats and includes a seat cushion frame 21 provided on the floor of a vehicle body, a seatback frame 22 attached to the seat cushion frame 21 such that the reclining angle thereof is adjustable, and a headrest 23 attached to the seatback frame 22 such that the height thereof is adjustable. The seat cushion frame 21 and the seatback frame 22 are provided with pad members (not illustrated), respectively, made of urethane or the like on the seating sides thereof, and are covered with covering members (not illustrated), respectively. Thus, a seat cushion and a seatback are provided.

Hereinafter, the seat cushion frame 21 and the seatback frame 22 are also referred to as "seat cushion 21" and "seatback 22", respectively.

The seat cushion frame 21 has a plurality of legs 26 to be attached to the floor of the vehicle body, and left and right connecting portions 27 connecting the seatback 22 to the seat cushion frame 21 such that the reclining angle of the seatback 22 is adjustable.

The seatback 22 includes left and right upper support members 31 and 32 by which the headrest 23 is rockably and slidably supported, left and right lower support members 33 and 34 by which the headrest 23 is rockably and slidably supported, a height adjustment mechanism 35 that adjusts the height of the headrest 23 and locks the headrest 23 at a specific position, and a support frame 40 that supports the left and right lower support members 33 and 34 and extends in the width direction of the seatback 22.

The headrest 23 includes a headrest body 36 provided above the seatback 22, and left and right stays 37 and 38 extending downward from the headrest body 36 into the seatback 22.

The left stay 37 has a plurality of wedge-shaped engaging portions 39 into which the height adjustment mechanism 35 is fitted. The right stay 38 has the same diameter as the left stay 37 but has no engaging portions 39.

The headrest body 36 has such a mass that, when vibration at a specific frequency is applied to the seatback 22, the phase of the headrest body 36 becomes different (for example, the reverse phase) from that of the seatback 22. The specific frequency, i.e., a target frequency, ranges from 15 to 20 Hz.

The left and right upper support members 31 and 32 are provided at an upper part of the seatback 22. The left and right upper support members 31 and 32 have larger diameters than the respective stays 37 and 38 and have left and right guide portions 41 and 42, respectively, that guide the respective stays 37 and 38 with backlashes from the outer peripheries of the stays 37 and 38 provided therebetween.

That is, specific clearances in the radial direction are provided between the guide portions 41 and 42 and the outer peripheries of the respective stays 37 and 38.

The left and right lower support members 33 and 34 have knife-edge support portions 43 and 44, respectively, that support the outer peripheries of the respective stays 37 and 38 such that the stays 37 and 38 are rockable and slidable in the left and right upper support members 31 and 32.

The left lower support member 33 has a through hole 45 provided in the knife-edge support portion 43 and allowing a locking member 58 to extend therethrough.

When the headrest body 36 is at the lowest position, the knife-edge support portions 43 and 44 are positioned substantially at the longitudinal centers of the respective stays 37 and 38.

The height adjustment mechanism 35 includes a locking-operation member 51, a return spring 52, and a housing 53. The locking-operation member 51 is provided to the seatback 22 and engages with the stay 37 at a specific position in the longitudinal direction of the stay 37. The return spring 52 causes the locking-operation member 51 to return to the initial position. The housing 53 houses a part of the locking-operation member 51 and the return spring 52.

The locking-operation member 51 includes an operation knob 56 with which the locking-operation member 51 is able to be disengaged from the left stay 37, an extension 57 extending from the operation knob 56 into the seatback 22, and the locking member (locking portion) 58 provided at the tip of the extension 57 and engaging with the left stay 37.

The operation knob 56, the extension 57, and the locking member 58 of the locking-operation member 51 are provided as an integral body.

The operation knob 56 is provided at a position higher than the position where the locking member (locking portion) 58 engages with the stay 37 and on a top surface 22a of the seatback 22.

When the headrest body 36 is at the lowest position, the locking member (locking portion) 58 engages with the stay 37 substantially at the longitudinal center of the stay 37. A tip 58a of the locking member 58 has a sharper angle than the engaging portions 39 provided in the left stay 37.

The left and right upper support members 31 and 32 have the respective guide portions 41 and 42 that guide the respective stays 37 and 38 with backlashes from the outer peripheries of the stays 37 and 38 provided therebetween. The left stay 37 has the wedge-shaped engaging portions 39 into which the height adjustment mechanism 35 is fitted. The left and right lower support members 33 and 34 have the respective knife-edge support portions 43 and 44 that support the outer peripheries of the respective stays 37 and 38. The tip 58a of the locking member (locking portion) 58 has a sharper angle than the engaging portions 39 provided in the left stay 37. Therefore, when any vibration is applied to the seatback 22, the headrest body 36 can rock on fulcrums defined by the knife-edge support portions 43 and 44 and the locking member (locking portion) 58.

That is, the headrest body 36 is rockable. Since the stays 37 and 38 are rockable on the fulcrums defined by the locking member 58 and the support portions 43 and 44 when any vibration is applied to the seatback 22, the headrest body 36 is rockable likewise.

The housing 53 includes two separate members of an upper housing 61 and a lower housing 62. The housing 53 has a guide portion 63 that guides the operation knob 56, a retaining portion 64 that retains the return spring 52, and a through hole 65 through which the extension 57 extends.

Figure 4A:
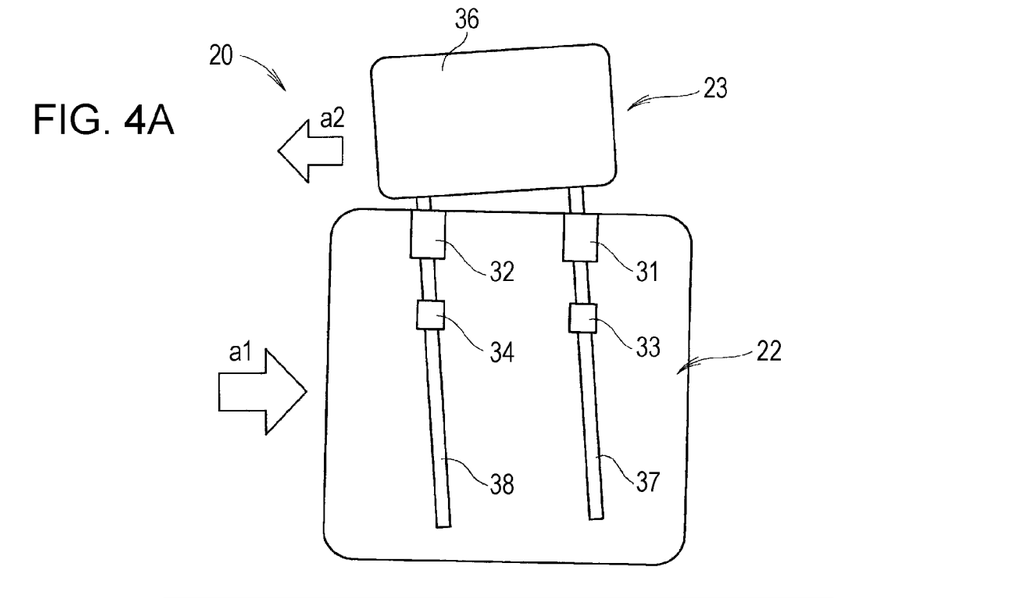
FIGS. 4A and 4B illustrate the behavior of the vehicle seat illustrated in FIG. 1.

Referring to FIG. 4A, when vibration is applied to the seatback 22 as indicated by arrow a1, the seatback 22 vibrates laterally because the stays 37 and 38 are rockable on the fulcrums defined by the locking member 58 and the support portions 43 and 44. Meanwhile, under the law of inertia, the headrest body 36 maintains the state before the vibration is applied. Therefore, the headrest body 36 behaves as a load acting on the seatback 22 in the direction of arrow a2. Consequently, the vibration of the seatback 22 is damped by the headrest body 36 that is rockable.

Figure 4B:
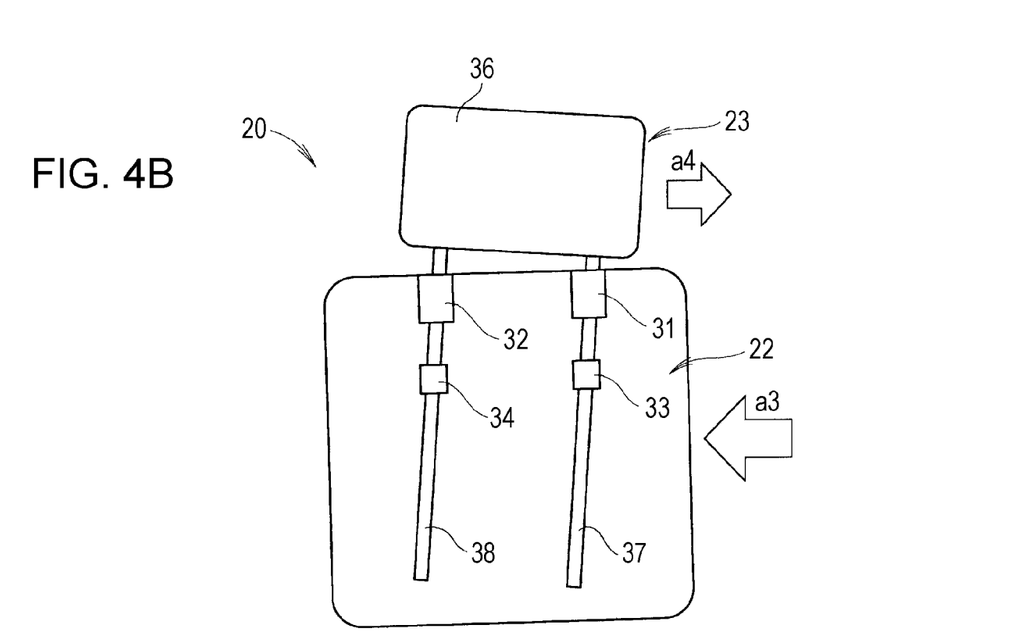

Referring to FIG. 4B, when vibration is applied to the seatback 22 as indicated by arrow a3, the headrest body 36 behaves as a load acting on the seatback 22 in the direction of arrow a4. Consequently, the vibration of the seatback 22 is damped by the headrest body 36 that is rockable.

As illustrated in FIGS. 1 to 3, the vehicle seat 20 includes the seatback 22 provided on the floor of the vehicle body, the headrest body 36 provided above the seatback 22, and the stays 37 and 38 extending downward from the headrest body 36 into the seatback 22.

The locking member 58 engaging with the stay 37 at a specific position in the longitudinal direction of the stay 37 is provided to the seatback 22. When the headrest body 36 is at the lowest position, the locking member 58 engages with the stay 37 substantially at the longitudinal center of the stay 37. That is, even if the headrest body 36 is at the lowest position, the headrest body 36 can rock on the fulcrum defined at the position where the locking member 58 engages with the stay 37. The rocking of the headrest body 36 cancels out the vibration of the seatback 22. Thus, the vibration of the seatback 22 is damped. Accordingly, the increase in the weight of the vehicle body and the increase in manufacturing cost are suppressed.

In the vehicle seat 20, the headrest body 36 has such a mass that, when vibration at a specific frequency is applied to the seatback 22, the phase of the headrest body 36 becomes different (for example, the reverse phase) from that of the seatback 22. Therefore, the vibration of the seatback 22 is efficiently cancelled out.

When any vibration is applied to the seatback 22, the stay 37 of the headrest body 36 rocks on the fulcrum defined by the locking member 58. Therefore, the vibration of the seatback 22 is cancelled out.

In the vehicle seat 20, the upper support members 31 and 32 that guide the respective stays 37 and 38 are provided at the upper part of the seatback 22, and the upper support members 31 and 32 have the respective guide portions 41 and 42 provided such that specific clearances are provided in the radial direction from the outer peripheries of the stays 37 and 38. Therefore, the stays 37 and 38 are guided when the headrest body 36 is moved vertically, and the amplitude of vibration of the headrest body 36 falls within a specific range.

In the vehicle seat 20, the operation knob 56 with which the locking member 58 is able to be disengaged from the left stay 37 is provided on the seatback 22 at a position higher than the position where the locking member 58 engages with the left stay 37 and on the top surface 22a of the seatback 22. Therefore, the locking member 58 can be easily disengaged from the left stay 37. Consequently, the ease of operation in vertically moving the headrest body 36 is increased.

During the development of the vehicle seat 20 described above, the present inventors conducted the following experiment.

Comparative Experiment

A comparative experiment conducted during the development of the present invention will now be described. The comparative experiment is not limited to the experiment described below. In the comparative experiment, a vehicle seat 100 illustrated in FIG. 5 was taken as a comparative example to be compared with the vehicle seat 20 according to the embodiment of the present invention illustrated in FIG. 1, and the vibration-damping characteristics of the two were compared.

Figure 5:
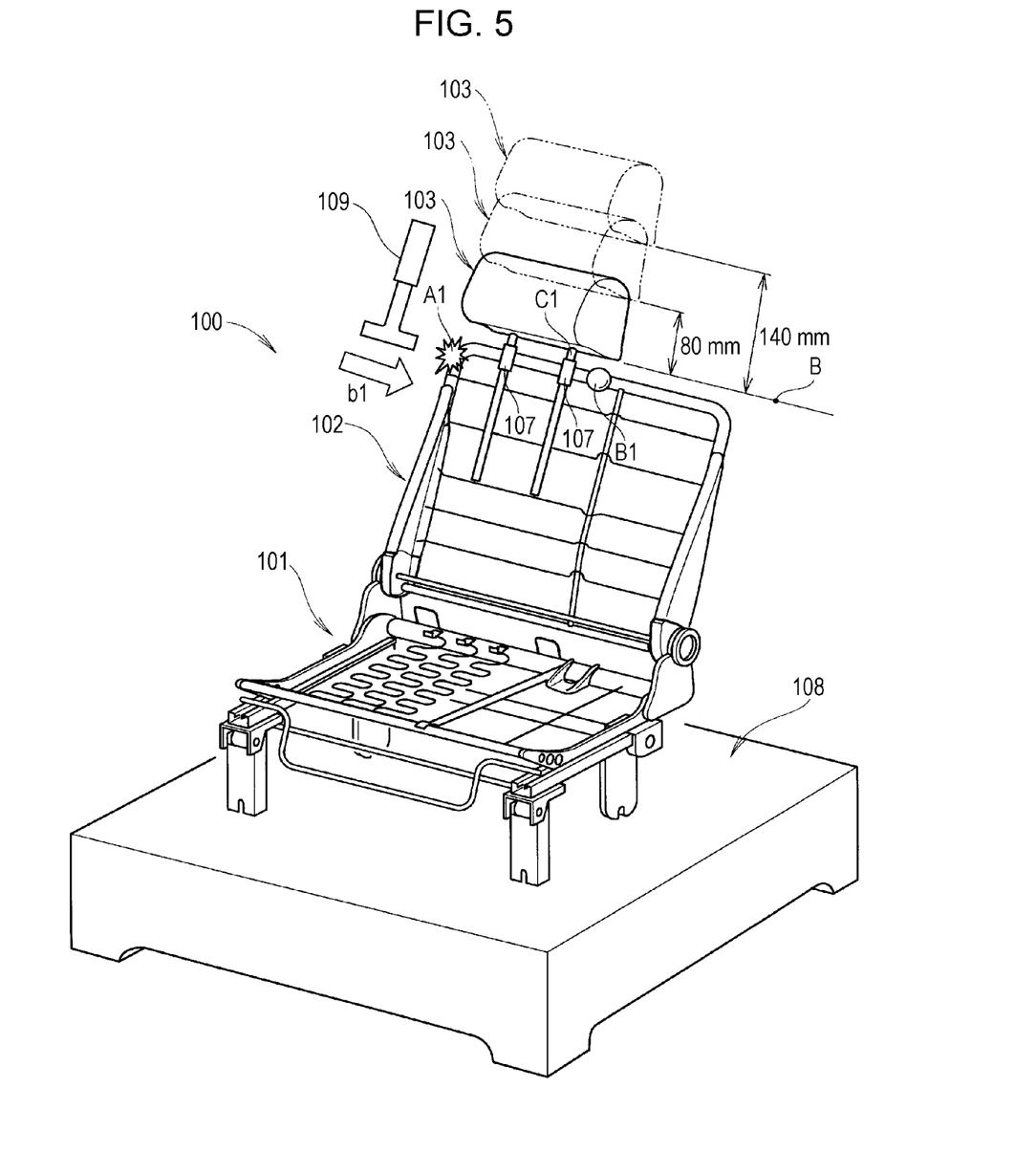
FIG. 5 illustrates a method of measuring the vibration-damping characteristic of a vehicle seat according to a comparative example.

Referring to FIG. 5, the vehicle seat 100 according to the comparative example includes a seat cushion frame 101, a seatback frame 102 reclinably attached to the seat cushion frame 101, and a headrest 103 attached to the top of the seatback frame 102 such that the height thereof is adjustable. The seatback frame 102 has headrest-supporting portions 107 that support the headrest 103. The seat cushion frame 101 and the seatback frame 102 are provided with pad members (not illustrated), respectively, made of urethane or the like on the seating sides thereof, and are covered with covering members (not illustrated), respectively. Thus, a seat cushion and a seatback are provided.

Hereinafter, the seat cushion frame 101 and the seatback frame 102 are also referred to as "seat cushion 101" and "seatback 102", respectively.

The vehicle seat 100 was fixed to a surface plate 108, and vibration was applied to the vehicle seat 100 with a hammer 109 as indicated by arrow b1. Then, the vibration-damping characteristic was measured. Likewise, the vehicle seat 20 was fixed to a surface plate the same as that used for the vehicle seat 100, and the same vibration as that applied to the vehicle seat 100 was applied to the vehicle seat 20 with a hammer. Then, the vibration-damping characteristic was measured.

In FIG. 5, A1 denotes the hammering position, B1 denotes the acceleration measurement position for the seatback, and C1 denotes the acceleration measurement position for the headrest.

Method of Measuring Vibration-Damping Characteristics
Fix the vehicle seats 20 and 100 to the surface plates.
Hammer the seatback frames 22 and 102 from one side.
Items Measured:
Changes in the lateral accelerations (G) of the seatback frames 22 and 102 versus time
Changes in the lateral accelerations (G) of the headrests 23 and 103 versus time
Masses of the headrests 23 and 103: 780 g
Positions of the headrests 23 and 103:
Base position (lowest position) B
Base position B+80 mm
Base position B+140 mm FIGS. 6A to 6C each illustrate the vibration-damping characteristics of the seatback frames 22 and 102 (see FIGS. 1 and 5 for reference numerals). The horizontal axis represents time (sec), and the vertical axis represents acceleration (G).

Figure 6A:
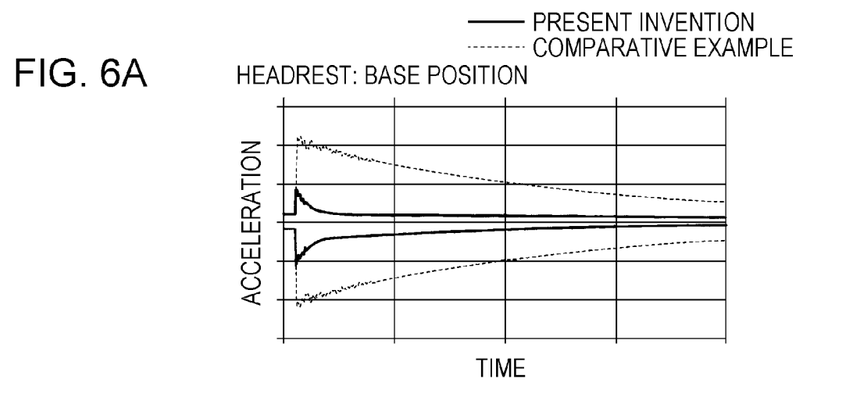
FIGS. 6A, 6B, and 6C are graphs each illustrating the vibration-damping characteristics of seatbacks.

Referring to FIG. 6A, when the headrest 23 according to the embodiment of the present invention was at the base position (lowest position) B, a significant vibration-damping effect was observed with time. Meanwhile, when the headrest 103 according to the comparative example was at the base position (lowest position) B, although some vibration-damping effect was observed with time, the vibration-damping effect was not so significant.

Figure 6B:
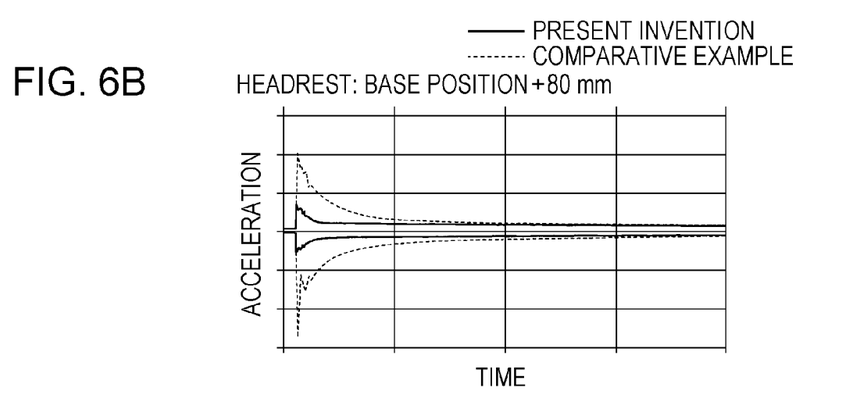

Referring to FIG. 6B, when the headrest 23 according to the embodiment of the present invention was at the base position (lowest position) B+80 mm, a more significant vibration-damping effect than that at the base position B was observed with time. Meanwhile, when the headrest 103 according to the comparative example was at the base position B+80 mm, although some vibration-damping effect greater than that at the base position B was observed with time, the vibration-damping effect was not greater than that in the case of the headrest 23 according to the embodiment of the present invention at the base position (lowest position) B.

Figure 6C:
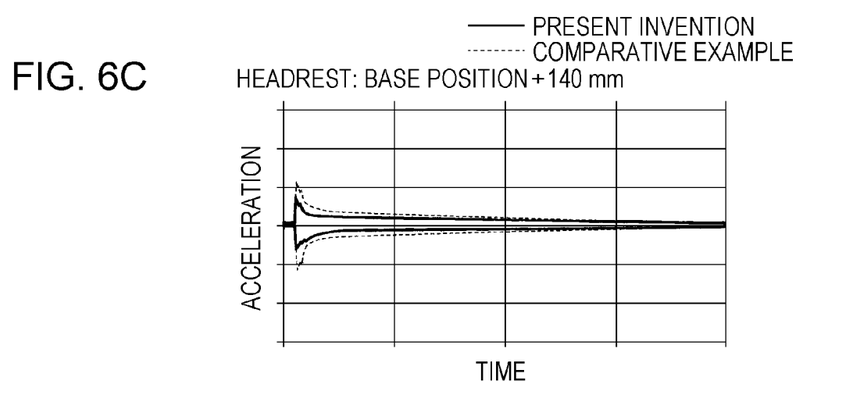

Referring to FIG. 6C, when the headrest 23 according to the embodiment of the present invention was at the base position (lowest position) B+140 mm, a much more significant vibration-damping effect than those at the base position B and at the base position B+80 mm was observed with time. Meanwhile, when the headrest 103 according to the comparative example was at the base position B+140 mm, a significant vibration-damping effect greater than those at the base position B and at the base position B+80 mm was observed with time, and the vibration-damping effect was almost the same as that in the case of the headrest 23 according to the embodiment of the present invention at the base position (lowest position) B.

The results illustrated in FIGS. 6A to 6C show that, in the case of the headrest 103, a greater vibration-damping effect was produced at a higher position.

Figure 7A:
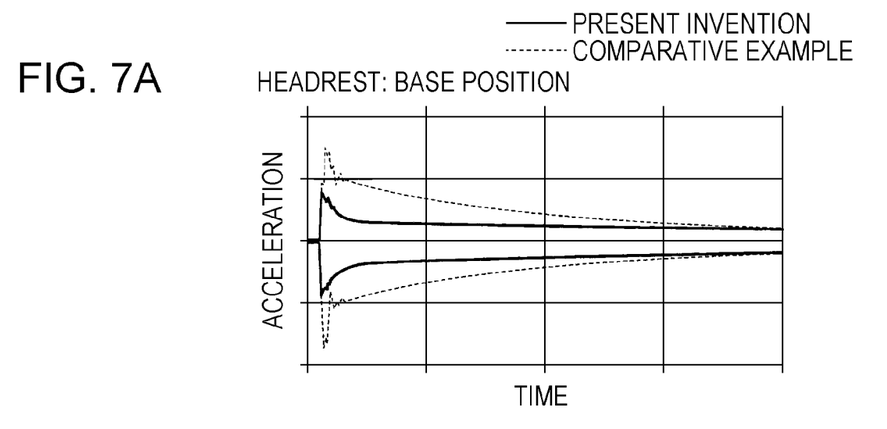
FIGS. 7A, 7B, and 7C are graphs each illustrating the vibration-damping characteristics of headrests.
Figure 7B:
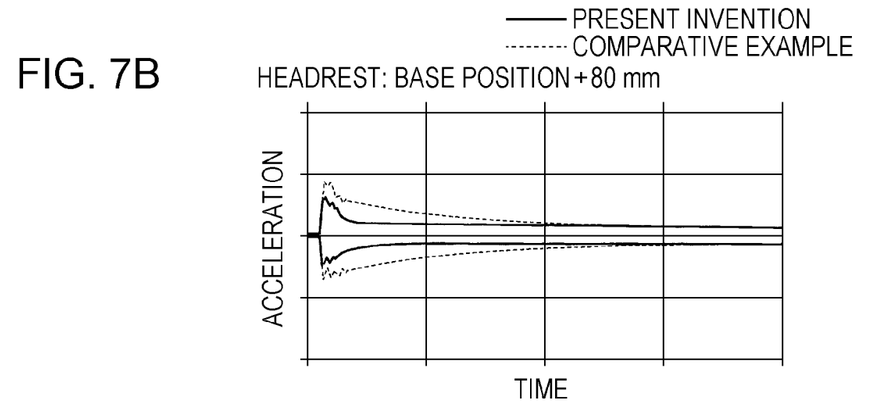
Figure 7C:
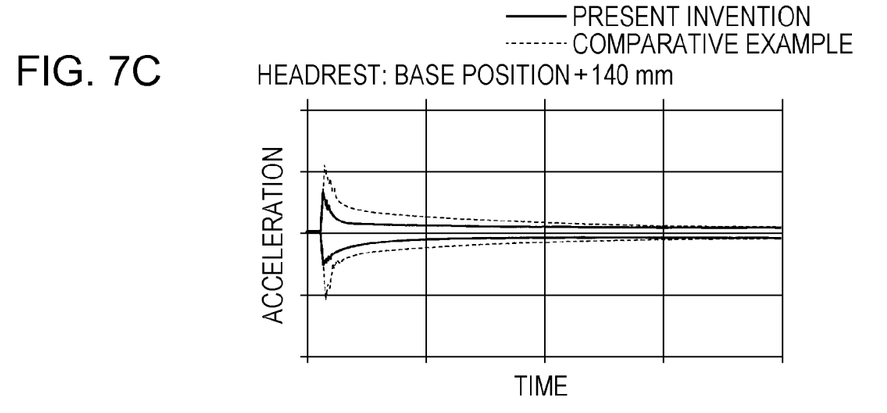

FIGS. 7A to 7C each illustrate the vibration-damping characteristics of the headrests 23 and 103. The horizontal axis represents time (sec), and the vertical axis represents acceleration (G).

Referring to FIG. 7A, when the headrest 23 according to the embodiment of the present invention was at the base position (lowest position) B, a significant vibration-damping effect was observed with time. Meanwhile, when the headrest 103 according to the comparative example was at the base position (lowest position) B, although some vibration-damping effect was observed with time, the vibration-damping effect was not so significant.

Referring to FIG. 7B, when the headrest 23 according to the embodiment of the present invention was at the base position (lowest position) B+80 mm, a more significant vibration-damping effect than that at the base position B was observed with time. Meanwhile, when the headrest 103 according to the comparative example was at the base position B+80 mm, although some vibration-damping effect greater than that at the base position B was observed with time, the vibration-damping effect was not greater than that in the case of the headrest 23 according to the embodiment of the present invention at the base position (lowest position) B.

Referring to FIG. 7C, when the headrest 23 according to the embodiment of the present invention was at the base position (lowest position) B+140 mm, a much more significant vibration-damping effect than those at the base position B and at the base position B+80 mm was observed with time. Meanwhile, when the headrest 103 according to the comparative example was at the base position B+140 mm, a significant vibration-damping effect greater than those at the base position B and at the base position B+80 mm was observed with time, and the vibration-damping effect was almost the same as that in the case of the headrest 23 according to the embodiment of the present invention at the base position (lowest position) B.

The results illustrated in FIGS. 7A to 7C show that the vibration levels of the headrests 23 and 103 were lower at the base position B+80 mm and at the base position B+140 mm than those at the base position (lowest position) B. This is considered to be because the vibrations were cancelled out between the seatback frame 22 and the headrest 23 and between the seatback frame 102 and the headrest 103.

Figure 8:
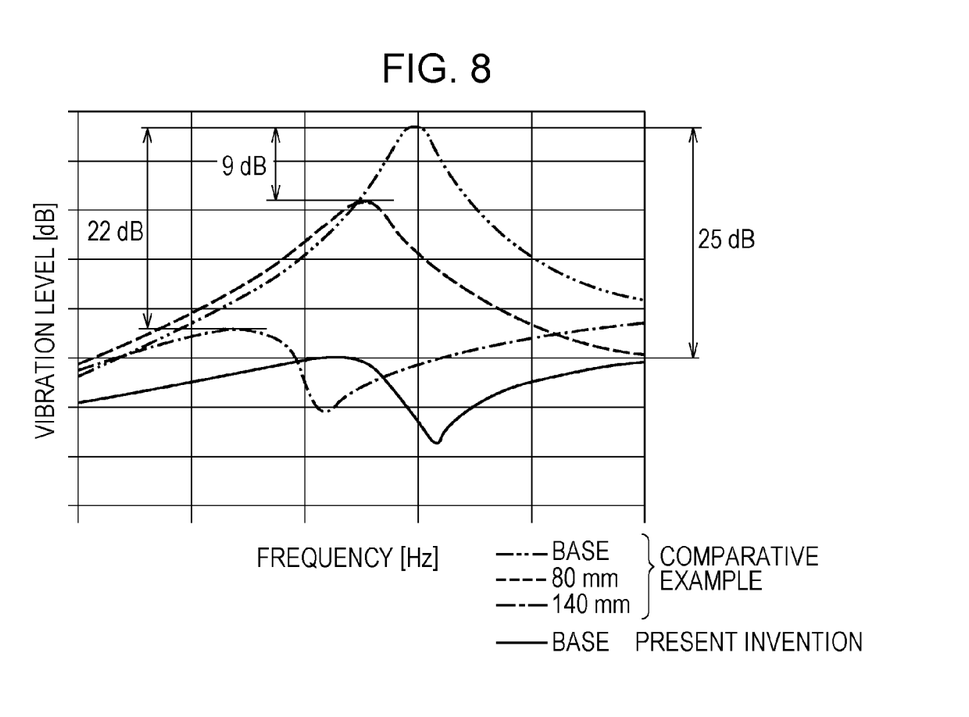
FIG. 8 is a graph illustrating changes in vibration level versus vibration frequency.

FIG. 8 illustrates the vibration levels of the vehicle seats 20 and 100 (see FIGS. 1 and 5 for the reference numerals) versus vibration frequency, the vehicle seats 20 and 100 each being installed in a vehicle body. The horizontal axis represents vibration frequency (Hz), and the vertical axis represents vibration level (dB).

When the headrest 103 according to the comparative example was at the base position (lowest position) B, a mountain-shaped vibration characteristic curve having a peak ranging around 31 Hz was observed.

When the headrest 103 according to the comparative example was at the base position (lowest position) B+80 mm, a mountain-shaped vibration characteristic curve having a peak ranging around 30 Hz was observed with a reduction in the peak value of about 9 dB from that in the case of the headrest 103 at the base position (lowest position) B.

When the headrest 103 according to the comparative example was at the base position B+140 mm, a vibration characteristic curve having a peak ranging around 28 Hz was observed, with the lowest value observed around 29.5 Hz followed by a gradual increase along with the increase in frequency. The peak value was reduced by about 22 dB from that in the case of the headrest 103 at the base position (lowest position) B.

In contrast, when the headrest 23 according to the embodiment of the present invention was at the base position B, a vibration characteristic curve having a peak ranging around 30 Hz was observed, with the lowest value observed around 31.5 Hz followed by a gradual increase along with the increase in frequency. The peak value was reduced by about 25 dB from that in the case of the headrest 103 at the base position (lowest position) B.

Figure 9:
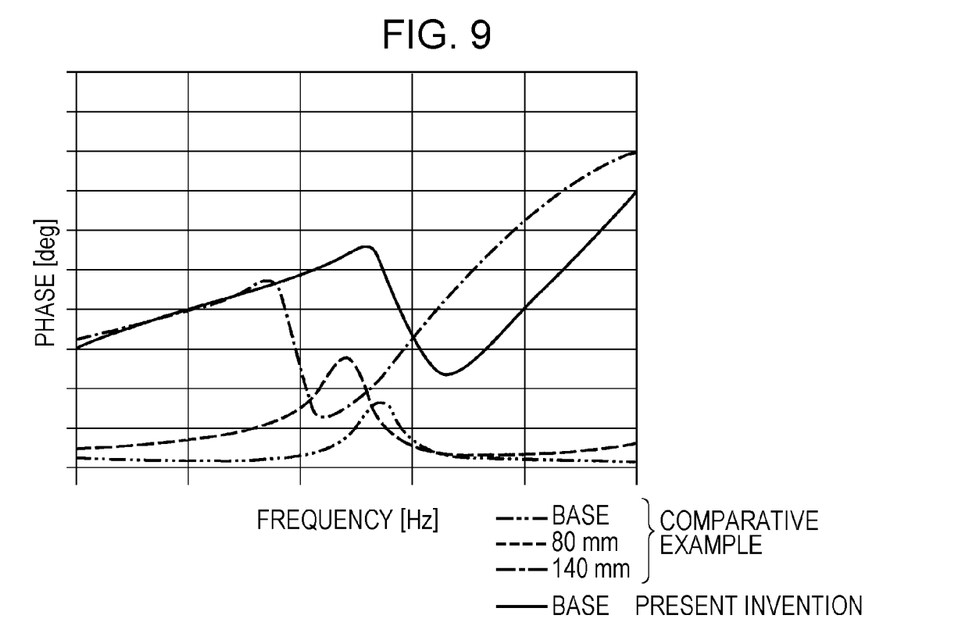
FIG. 9 is a graph illustrating changes in phase versus vibration frequency.

FIG. 9 illustrates the phases of the vehicle seats 20 and 100 (see FIGS. 1 and 5 for the reference numerals) versus vibration frequency, the vehicle seats 20 and 100 each being installed in a vehicle body. The horizontal axis represents vibration frequency (Hz), and the vertical axis represents phase (deg).

When the headrest 103 according to the comparative example was at the base position (lowest position) B, a phase change curve having a peak ranging around 30 Hz was observed. The peak value was about 15 deg, which is a small value.

When the headrest 103 according to the comparative example was at the base position B+80 mm, a moderate-mountain-shaped phase change curve having a peak widely ranging from 25 Hz to 31 Hz was observed. The peak value was about 30 deg.

When the headrest 103 according to the comparative example was at the base position B+140 mm, a phase change curve having a peak ranging around 28 Hz at about 50 deg was observed. The phase decreased to about 15 deg at a frequency of over 29 Hz. Subsequently, the phase rapidly increased until the frequency reached 35 Hz, at which the phase was 80 deg.

When the headrest 23 according to the embodiment of the present invention was at the base position B, a phase change curve having a peak ranging around 30.5 Hz at about 58 deg was observed. The phase decreased to about 20 deg at a frequency of over 31 Hz. Subsequently, the phase rapidly increased until the frequency reached 35 Hz, at which the phase was 70 deg.

The results illustrated in FIGS. 8 and 9 show that the heights of the headrests 23 and 103 significantly affected the vibration levels and phases of the seatback frames 22 and 102. If the above results regarding the heights of the headrests 23 and 103 are reflected in designing a vehicle seat for practical use, vibration of the vehicle seat is considered to be reduced. It was demonstrated that, even if the headrest 23 according to the embodiment of the present invention was at the base position (lowest position) B, the vibration-damping effect of the seatback frame 22 and the difference in phase between the headrest 23 and the seatback frame 22 were both larger than those in the case where the headrest 103 according to the comparative example was at the base position B+140 mm.

Figure 10A:
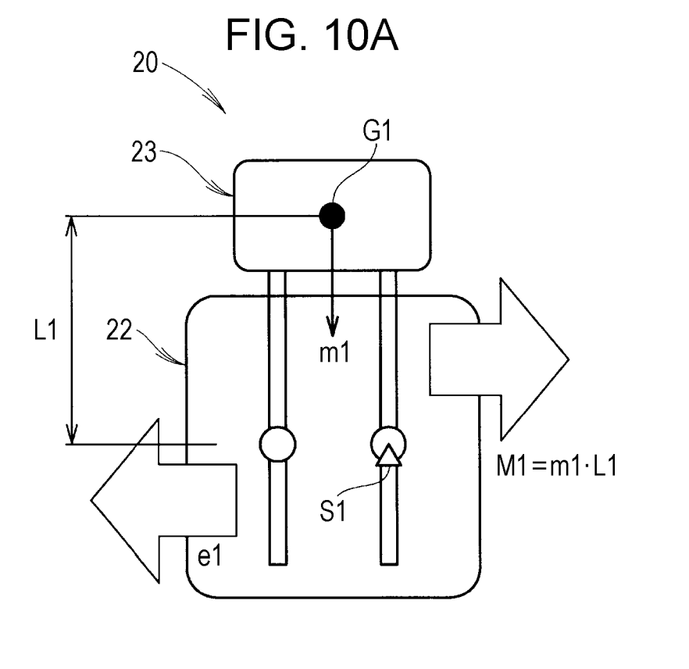
FIGS. 10A and 10B are diagrams of the vehicle seats illustrated in FIGS. 1 and 5, respectively, for a review of a comparative experiment.
Figure 10B:
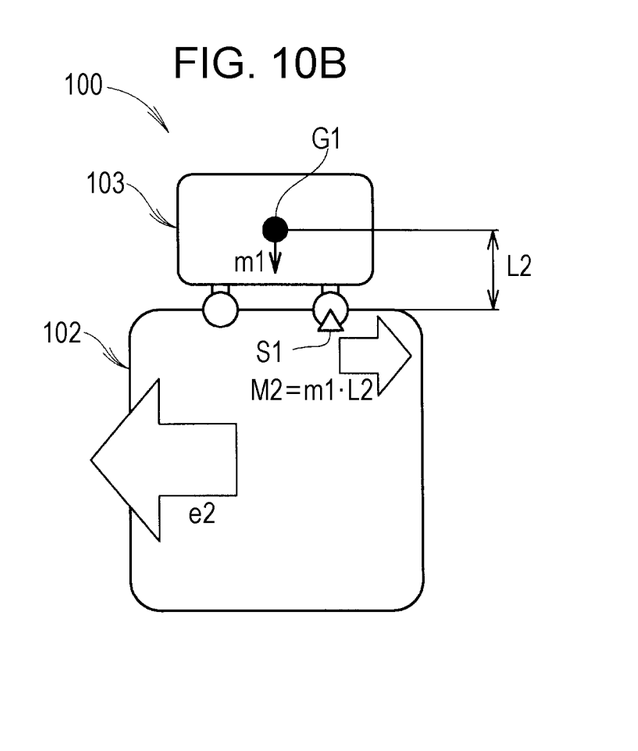

FIGS. 10A and 10B show the difference between the magnitudes of reactive forces applied to the seatbacks 22 and 102 by the headrest 23 according to the embodiment of the present invention and the headrest 103 according to the comparative example, respectively. In FIGS. 10A and 10B, m1 denotes the masses of the headrests 23 and 103; L1 and L2 denote the distances from the centers of gravity G1 of the respective headrests 23 and 103 to fulcrums S1 for the headrests 23 and 103, where L1>L2; and M1 and M2 denote the moments applied to the respective fulcrums S1.

Referring to FIG. 10A illustrating the case where the headrest 23 according to the embodiment of the present invention was at the base position (lowest position) B, when the seatback 22 was vibrated toward the right as indicated by arrow e1, the moment M1=m1·L1 as a force cancelling out the vibration was applied to the fulcrum S1.

Referring to FIG. 10B illustrating the case where the headrest 103 according to the comparative example was at the base position B, when the seatback 102 was vibrated toward the right as indicated by arrow e2, the moment M2=m1·L2 as a force cancelling out the vibration was applied to the fulcrum S1.

As illustrated in FIGS. 10A and 10B, since the distance L1 is larger than the distance L2, the moment M1 is larger than the moment M2. That is, the longer the distances L1 and L2 from the centers of gravity G1 of the headrests 23 and 103 to the fulcrums S1, the larger the forces that cancel out the vibrations of the respective seatbacks 22 and 102. Furthermore, it is considered that the longer the distances L1 and L2, the slower the headrests 23 and 103 follow the movements of the respective seatbacks 22 and 102. Therefore, in the vehicle seat 20 according to the embodiment of the present invention, even if the headrest 23 is at the lowest position, the phase difference between the seatback 22 and the headrest 23 becomes large, and vibration is thus effectively cancelled out.

As illustrated in FIG. 1, in the vehicle seat 20 according to the embodiment of the present invention, the seatback 22 is attached to the seat cushion 21 such that the reclining angle thereof is adjustable. The present invention is not limited to such an embodiment. The seatback 22 may be directly attached to the floor of the vehicle body.

As illustrated in FIG. 2, in the vehicle seat 20 according to the embodiment of the present invention, the locking-operation member 51 includes the operation knob 56, the extension 57, and the locking member 58 that are provided as an integral body. Alternatively, the operation knob 56, the extension 57, and the locking member 58 may be provided as separate bodies according to need.

As illustrated in FIG. 2, in the vehicle seat 20 according to the embodiment of the present invention, the tip 58a of the locking member (locking portion) 58 has a knife-edge shape.

The present invention is not limited to such an embodiment. The tip 58a of the locking member (locking portion) 58 may have a conical, curved, or spherical shape. That is, the tip 58a of the locking member (locking portion) 58 only needs to have a shape producing a specific frictional resistance (friction) and allowing the stay 37 to be rockably supported.

The present invention is suitably applied to an automobile that includes a vehicle seat including a seatback, a headrest body provided above the seatback, and a stay extending downward from the headrest body into the seatback.

According to the embodiment of the present invention, a vehicle seat includes a seatback provided on a floor of a vehicle body, a headrest body provided above the seatback, a stay extending downward from the headrest body into the seatback, and a locking member provided to the seatback and engaging with the stay at a specific position in a longitudinal direction of the stay. When the headrest body is at a lowest position, the locking member engages with the stay at a position that is substantially at the longitudinal center of the stay.

This embodiment produces the following effect. In the vehicle seat according to this embodiment, even if the headrest body is at the lowest position, the headrest body can rock on a fulcrum defined at the position where the locking member engages with the stay. The rocking of the headrest body cancels out the vibration of the seatback. Thus, the vibration of the seatback is damped. Accordingly, the increase in the weight of the vehicle body and the increase in manufacturing costs are suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle seat comprising:
   a seatback provided on a floor of a vehicle body;
   a headrest body provided above the seatback;
   a stay extending downward from the headrest body into the seatback and including a plurality of engaging portions provided at predetermined positions in a longitudinal direction of the stay;
   an upper support member provided at an upper part of the seat back and including a guide portion having an inner diameter larger than an outer diameter of the stay, the guide portion being provided to guide the stay with a clearance provided between the guide portion and an outer periphery of the stay;
   a lower support member provided below the upper support member and provided to support the stay; and
   a locking member provided to the seatback and provided to engage with one of the engaging portions of the stay, the locking member engaging with one of the engaging portions that is provided at a substantially longitudinal center of the stay in the longitudinal direction when the headrest body is positioned at a lowest position, the headrest body and the stay being provided to be rockable within the guide portion and about a fulcrum defined by the locking member, wherein the lower support member includes a support portion inwardly protruding and slidably engaged with the stay, and a through-hole provided in the support portion, and wherein the locking member is provided in the through-hole to be engagable with the stay in the lower support member.

2. The vehicle seat according to claim 1, further comprising a locking-operation member,
   wherein the locking-operation member comprises:
      an operation knob capable of disengaging the locking-operation member from the stay;
      an extension extending from the operation knob into the seatback; and
      the locking member provided at a lower part of the extension and engaging with the stay.

3. The vehicle seat according to claim 2, wherein the operation knob, the extension, and the locking member of the locking-operation member are provided as an integral body.

4. The vehicle seat according to claim 1, further comprising:
   an operation knob capable of disengaging the locking member from the stay and provided at a position higher than a position where the locking member engages with the stay and on a top surface of the seatback.

* * * * *